United States Patent
Biessener

(10) Patent No.: US 6,701,456 B1
(45) Date of Patent: Mar. 2, 2004

(54) COMPUTER SYSTEM AND METHOD FOR MAINTAINING AN AUDIT RECORD FOR DATA RESTORATION

(75) Inventor: David W. Biessener, Woodbury, MN (US)

(73) Assignee: Voom Technologies, Inc., Lakeland, MN (US)

( * ) Notice: Subject to any disclaimer, the term of this patent is extended or adjusted under 35 U.S.C. 154(b) by 581 days.

(21) Appl. No.: 09/650,208

(22) Filed: Aug. 29, 2000

(51) Int. Cl.$^7$ ................................................ G06F 11/00
(52) U.S. Cl. ........................ 714/20; 714/16; 714/19; 714/45
(58) Field of Search ........................ 714/20, 45, 16, 714/17, 19

(56) References Cited

U.S. PATENT DOCUMENTS

| | | | |
|---|---|---|---|
| 4,819,154 A | | 4/1989 | Stiffler et al. |
| 4,959,774 A | | 9/1990 | Davis |
| 5,212,784 A | | 5/1993 | Sparks |
| 5,269,022 A | | 12/1993 | Shinjo et al. |
| 5,357,509 A | | 10/1994 | Ohizumi |
| 5,404,508 A | * | 4/1995 | Konrad et al. ............... 707/202 |
| 5,469,573 A | | 11/1995 | McGill, III et al. |
| 5,487,160 A | | 1/1996 | Bemis |
| 5,572,659 A | | 11/1996 | Iwasa et al. |
| 5,724,501 A | | 3/1998 | Dewey et al. |
| 5,740,397 A | | 4/1998 | Levy |
| 5,740,433 A | * | 4/1998 | Carr et al. ................... 707/202 |
| 5,742,792 A | | 4/1998 | Yanai et al. |
| 5,758,057 A | | 5/1998 | Baba et al. |
| 5,777,874 A | | 7/1998 | Flood et al. |
| 5,799,141 A | | 8/1998 | Galipeau et al. |
| 5,829,045 A | | 10/1998 | Motoyama |
| 5,829,046 A | | 10/1998 | Tzelnic et al. |
| 5,835,915 A | * | 11/1998 | Carr et al. ................... 707/202 |
| 6,000,020 A | | 12/1999 | Chin et al. |
| 6,018,746 A | * | 1/2000 | Hill et al. ..................... 707/202 |
| 6,041,420 A | * | 3/2000 | Skarpelos et al. .............. 714/7 |
| 6,044,444 A | | 3/2000 | Ofek |
| 6,079,000 A | * | 6/2000 | Cooper et al. ............... 711/162 |
| 6,081,875 A | | 6/2000 | Clifton et al. |
| 6,085,200 A | * | 7/2000 | Hill et al. ..................... 707/202 |
| 6,345,346 B1 | * | 2/2002 | Biessener et al. ........... 711/162 |

(List continued on next page.)

OTHER PUBLICATIONS

WWW.TIGERDIRECT.COM; Catalog Excerpt, Date Unknown, p. 92XKD; Showing GOBACK Utilities Software.

Primary Examiner—Scott Baderman
(74) Attorney, Agent, or Firm—Shumaker & Sieffert, P.A.

(57) ABSTRACT

A storage device for a computer, combining an audit trail storage with (1) a connector adapted for connecting the storage device to a connection point of the computer, (2) a primary storage having first data stored thereon, and adapted for sending the first data to the computer in response to a corresponding read command received at the connection point, and (3) secondary storage adapted for storing second data in response to a corresponding write command received at the connection point and further adapted for sending the second data to the computer in response to a corresponding read command received at the connection point. The audit trail storage is adapted for recording a log of communication activity occurring at the connection point. A storage device for a computer, comprising: (1) a connector connecting the storage device to a connection point of the computer; (2) a storage adapted for storing data in response to a corresponding write command received at the connection point and further adapted for sending the data to the computer in response to a corresponding read command received at the connection point, and (3) an audit trail storage adapted for recording a log of communication activity occurring at the connection point.

67 Claims, 11 Drawing Sheets

U.S. PATENT DOCUMENTS

| | | |
|---|---|---|
| 6,366,987 B1 | 4/2002 | Tzelnic et al. |
| 6,430,577 B1 * | 8/2002 | Hart .......................... 707/201 |
| 6,434,681 B1 | 8/2002 | Armangau |
| 6,446,090 B1 * | 9/2002 | Hart .......................... 707/201 |
| 6,549,992 B1 | 4/2003 | Armangau et al. |
| 6,553,392 B1 * | 4/2003 | Mosher, Jr. et al. ........ 707/204 |
| 6,557,089 B1 | 4/2003 | Reed et al. |
| 2002/0103982 A1 | 8/2002 | Ballard et al. |
| 2002/0144044 A1 | 10/2002 | Moon et al. |
| 2002/0199073 A1 | 12/2002 | Tamura et al. |
| 2003/0014605 A1 | 1/2003 | Slater et al. |
| 2003/0018657 A1 | 1/2003 | Monday |
| 2003/0061456 A1 | 3/2003 | Ofek et al. |

* cited by examiner

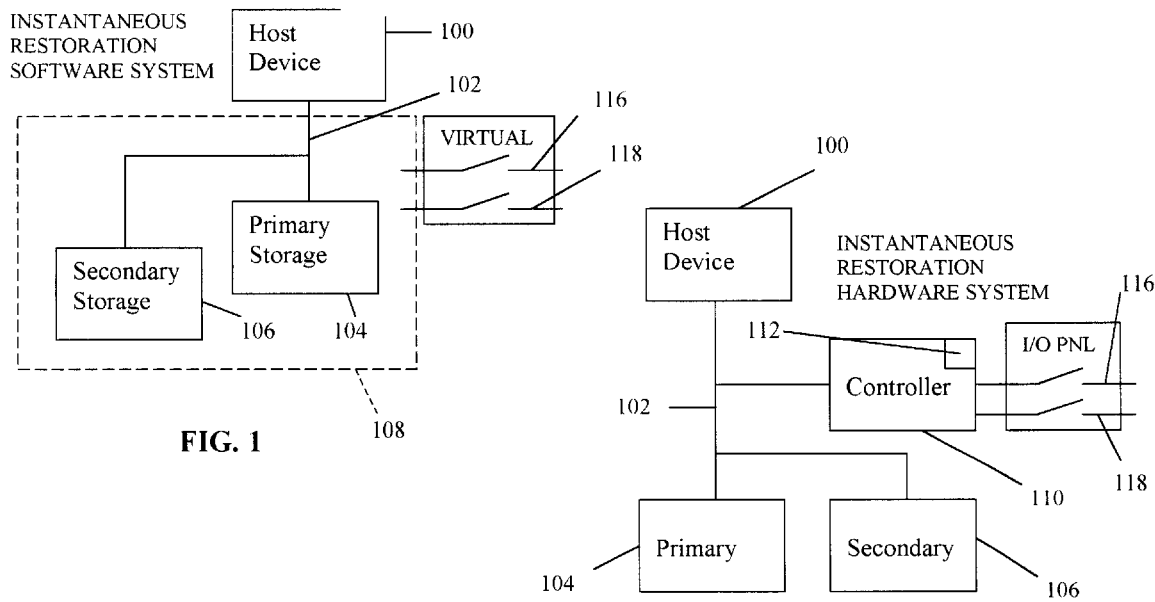
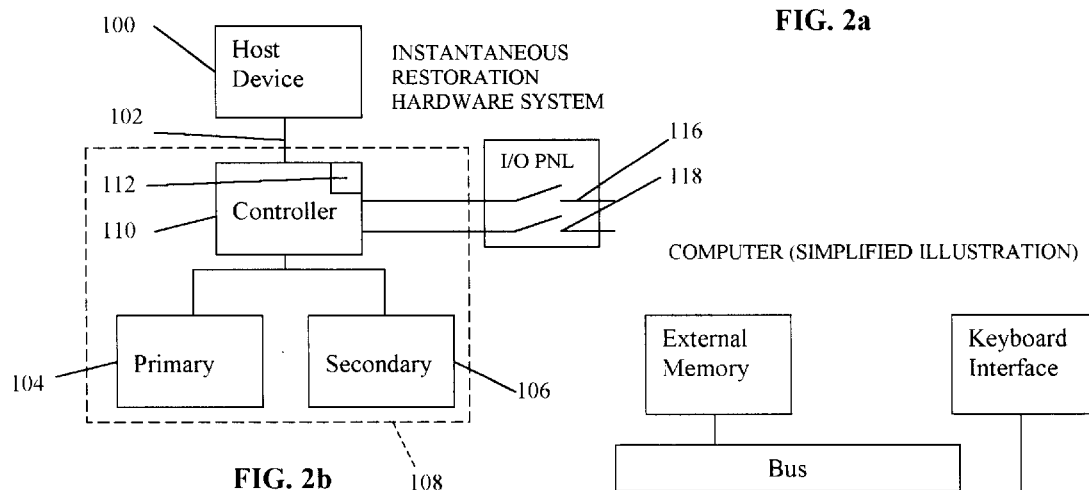
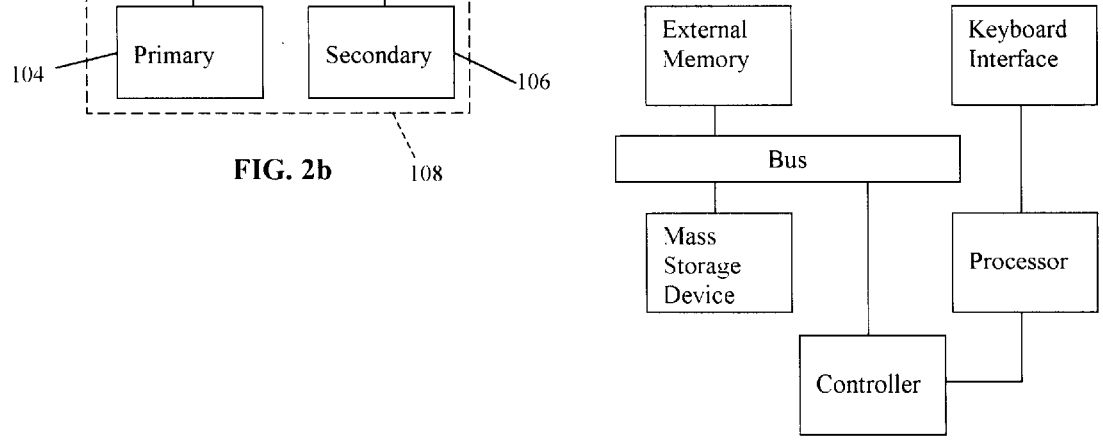
FIG. 1
FIG. 2a
FIG. 2b
FIG. 3

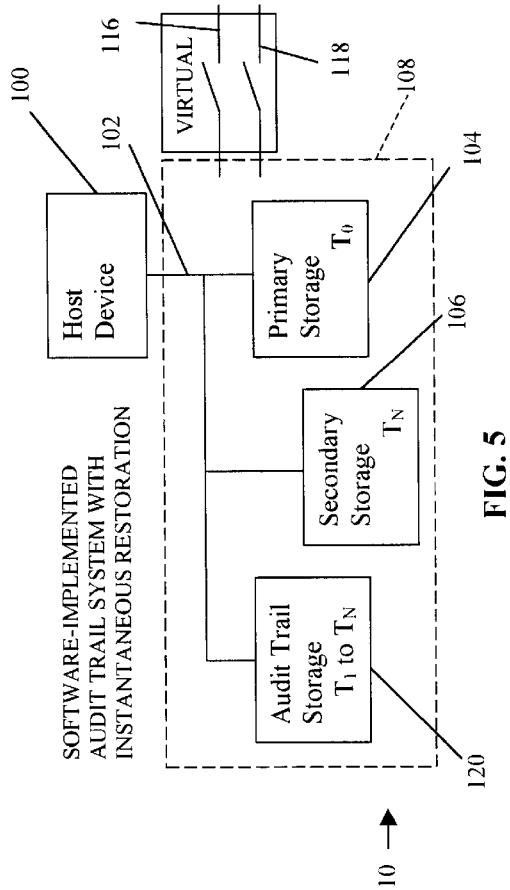

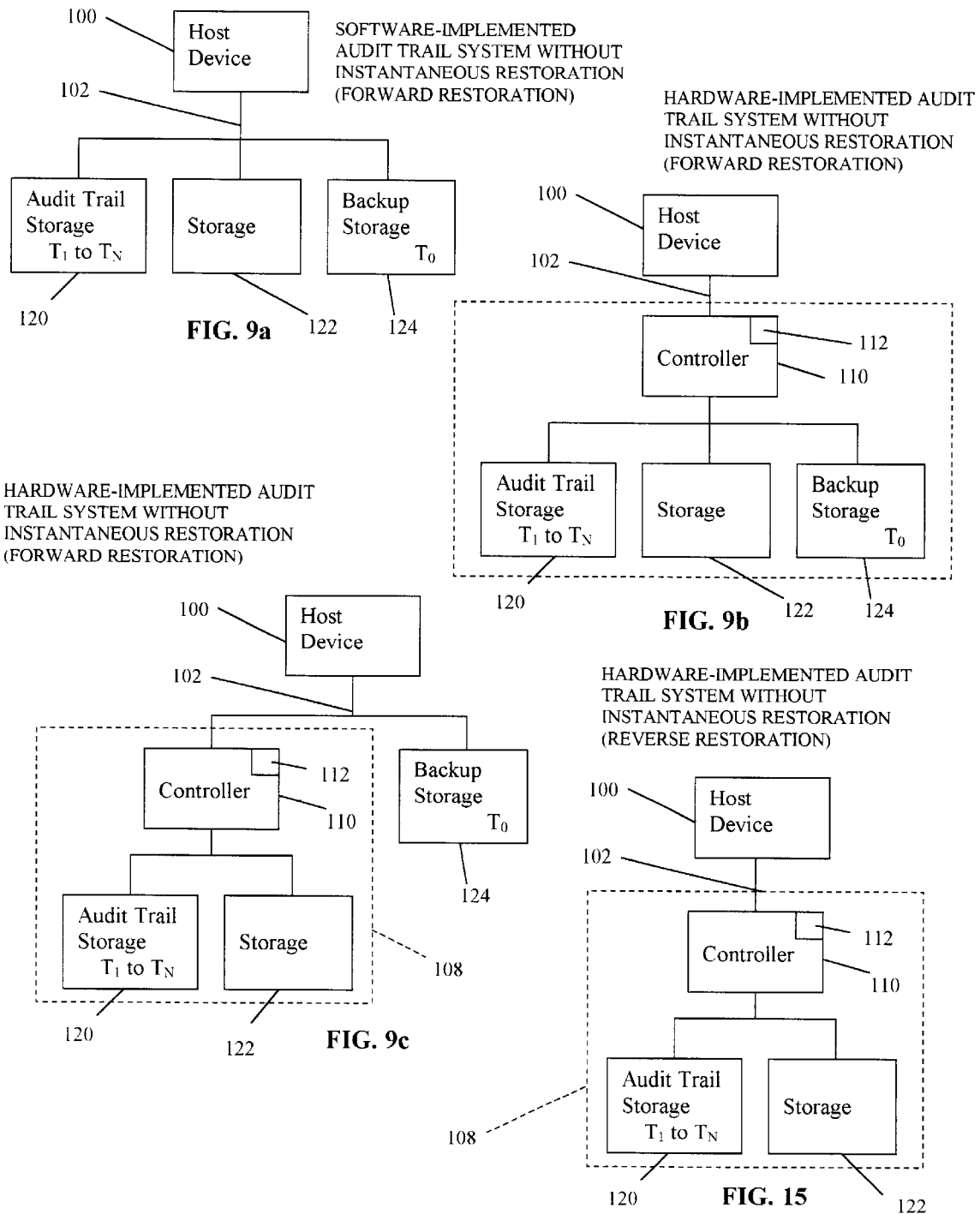

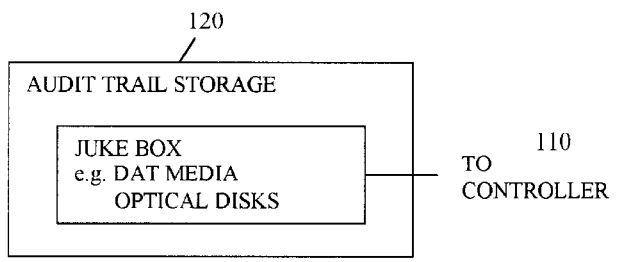
FIG. 16a
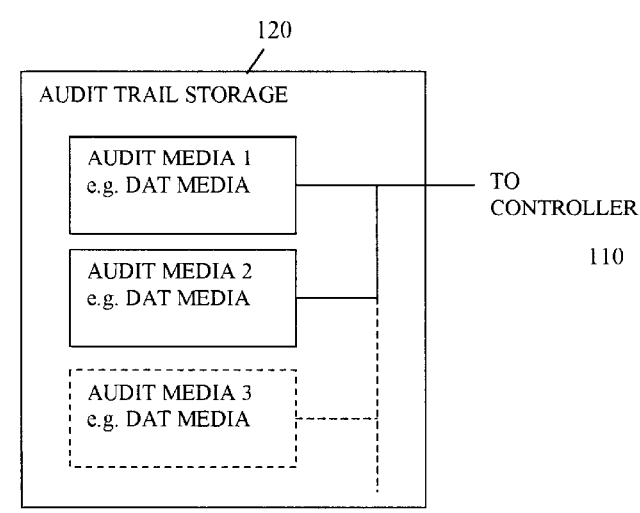
FIG. 16b
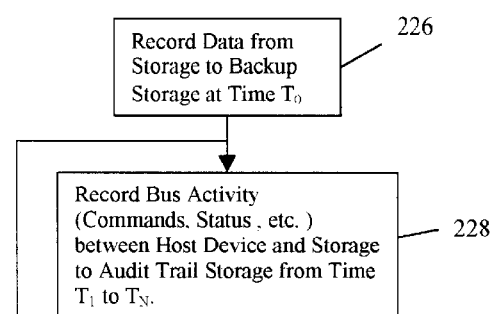
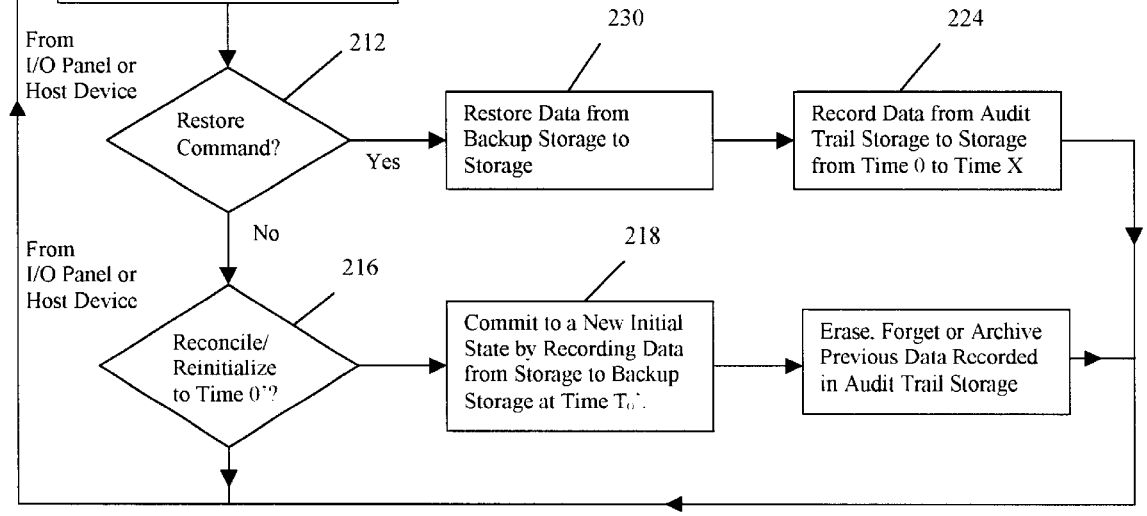
FIG. 10

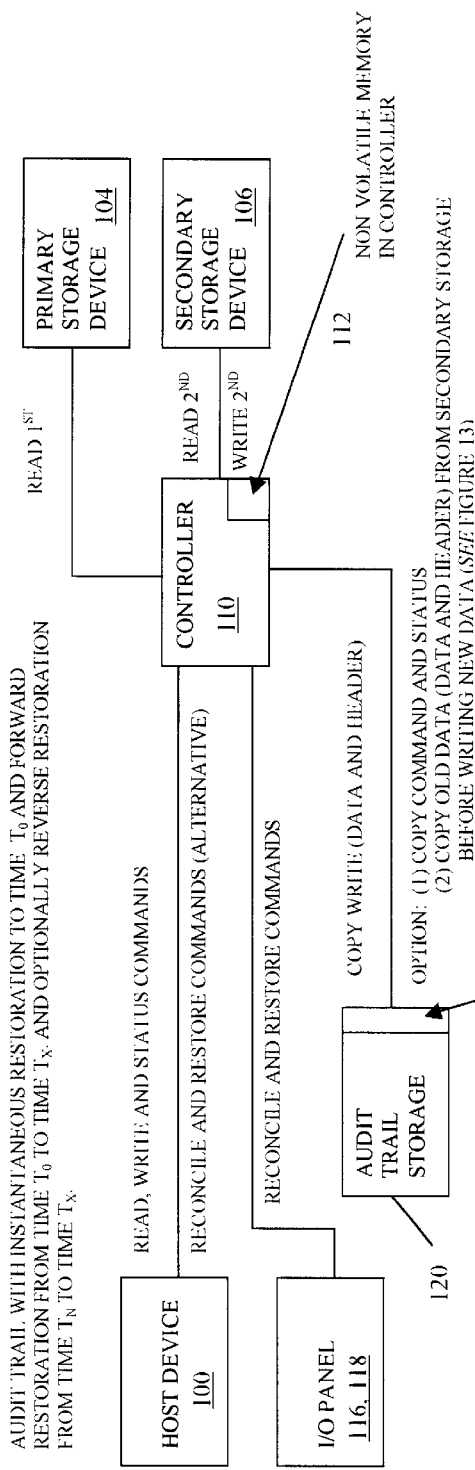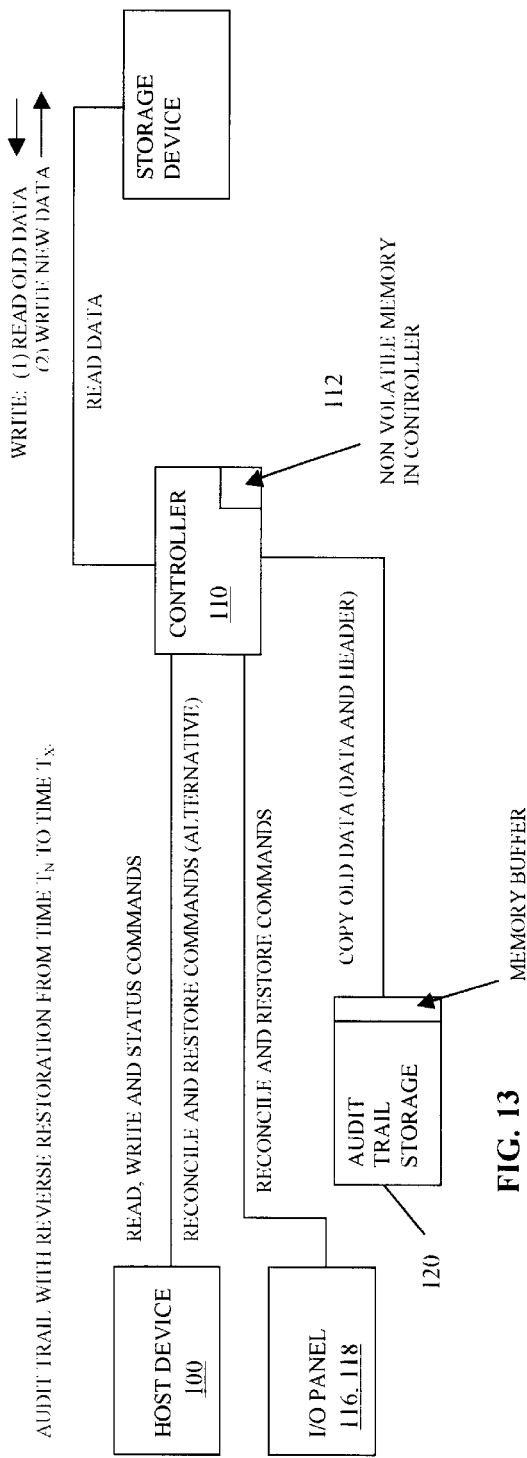

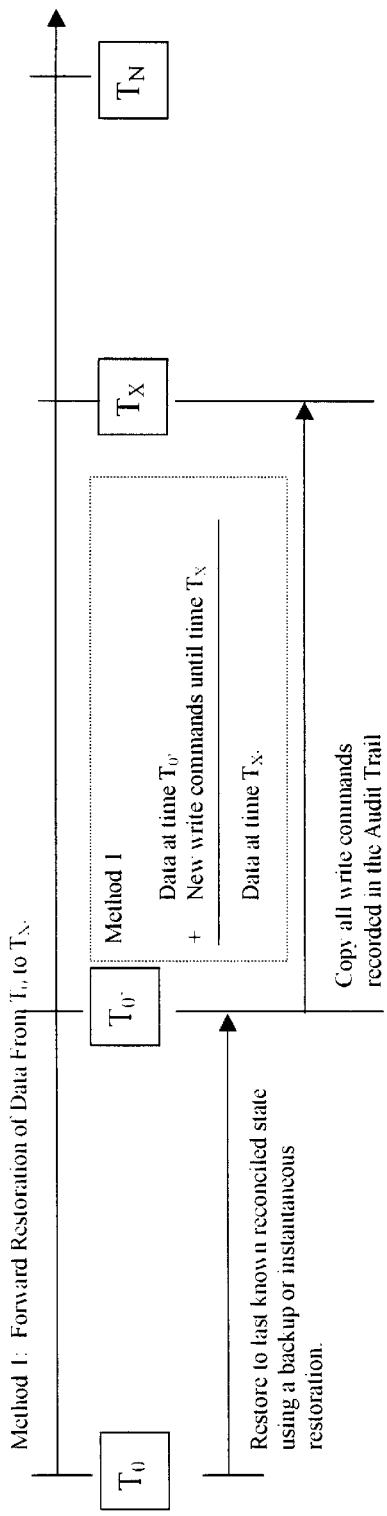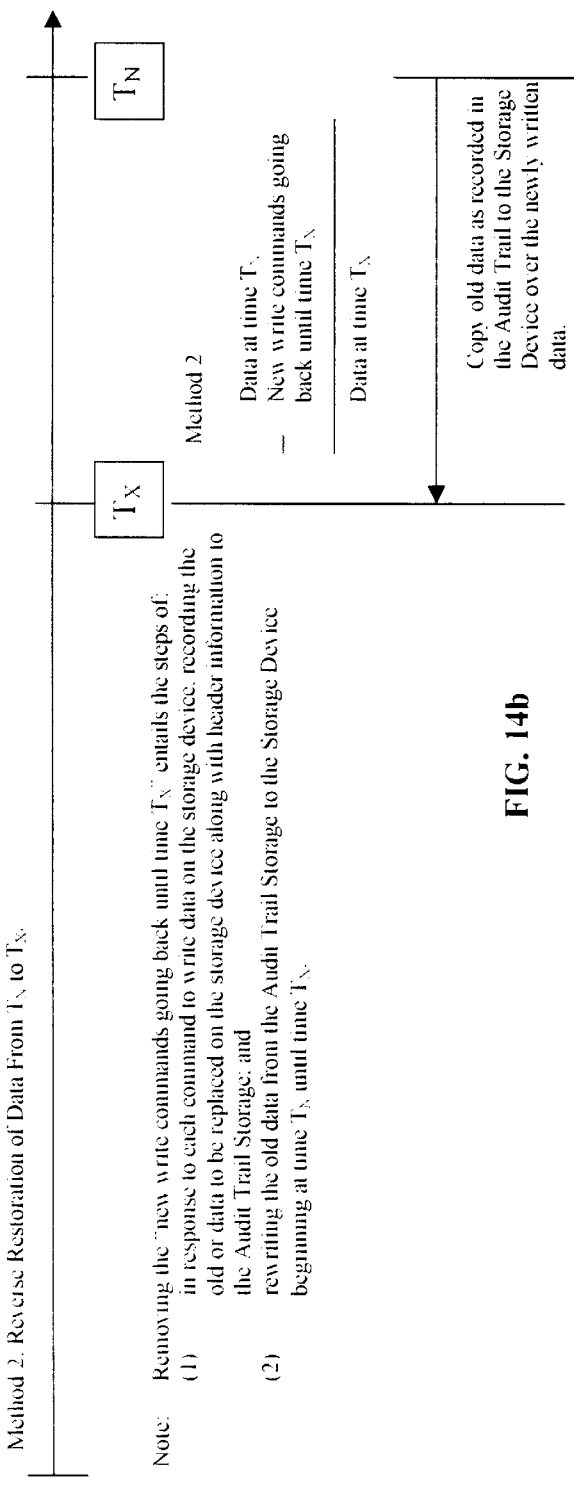
FIG. 14a
FIG. 14b

COMPUTER SYSTEM AND METHOD FOR MAINTAINING AN AUDIT RECORD FOR DATA RESTORATION

BACKGROUND OF THE INVENTION

1. Field of the Invention

The present invention relates, generally, to the restoration of a storage device such as a hard disk drive at a present state ($T_N$) to a previous state ($T_0$) or to any state ($T_X$) occurring during the time period between $T_0$ and $T_N$. More particularly, the invention relates to an audit trail that maintains a comprehensive record of hard disk write transactions and/or other activity that enables the storage device to undergo a forward restoration from $T_0$ to $T_X$ or a reverse restoration from $T_N$ to $T_X$ or that provides relevant data for forensic or diagnostic applications.

2. Background Information.

The restoration of a storage device for a computer, such as a hard disk drive, to a previous state is critical in many situations. For example, in enterprise computing situations, the hard disk drive often must be restored after installing new software if bugs or other problems are encountered. This situation also presents itself in other environments. For example, a user installing a new version of an operating system to his or her hard disk drive may find that the operating system does not function as advertised, and that he or she desires to restore the disk drive to the previous operating system.

The restoration process is generally similar for both of these situations. First a backup of the storage device is made to another storage device, such as a hard disk drive. The new software is then installed, and the system is booted and tested. When a problem arises such that restoration is required, the backup previously made is copied back to the hard drive. However, this is a less than optimal solution because backing up and restoring a storage device can take hours for a personal computer and can literally take days in an enterprise situation. Thus, the testing process of new software installations becomes needlessly time intensive. Furthermore, if a virus or other problem arises during the operation of the system, the restoration of the system is only as good as the last backup. To compound the problem, there may be a period of time in which the problem is undetected, which may lead to backing up corrupted data over a good back up.

A substantially instantaneous storage restoration solution is described in U.S. application Ser. No. 09/258,413, filed Feb. 26, 1999 by David Biesner, Joseph Frolik, and Gaston Biesner, and entitled Substantially Instantaneous Storage Restoration for Non-Computer Forensics Applications. That application describes a system that includes a host device such as a processor or computer, a connection point at the host device such as a communication bus, a primary storage and a secondary storage. The primary storage has stored thereon first data, and sends this data to the host device in response to receiving a corresponding read command at the connection point. The secondary storage stores second data in response to receiving a write command including this data at the connection point, and sends the second data in response to receiving a corresponding read command at the connection point. Thus, a first state can be defined as the first data already on the primary storage. Subsequent (second) data sent to the connection point by the host device is written to the secondary storage. Read commands from the host device are handled either by the primary or the secondary storage, depending on whether the command relates to the first data stored on the primary storage, or the second data stored on the secondary storage. Optimally, in at least some embodiments, this process is transparent to the host device.

That application also describes another embodiment in which first data can be copied to the secondary storage and their roles (as the primary and the secondary storage) reversed. Furthermore, in some embodiments, near instantaneous reconciliation can be achieved by updating the secondary storage during free bus cycles. Therefore, when restoration is required to the first state, in at least some embodiments the system also includes a switch, either hardware or software, that instantly restores the secondary storage to an initial state prior to which the second data was stored thereon. This means that restoration to the first state is performed substantially instantaneously—the primary storage still has stored thereon the first data, and the secondary storage stores anew. Furthermore, when a new 'first state' is desired, such that this new state includes both the first data stored on the primary storage and the second data stored on the secondary storage, then another switch of the system in at least some embodiments is included that copies the second data from the secondary storage to the primary storage, and the secondary storage is again restored to an initial state prior to which the second data was stored thereon. Thus, new third data sent by the host device is now stored on the secondary storage, such that restoration to the "first state" means restoration to the state where the primary storage has first and second data stored thereon.

In the timeline of events leading from $T_O$ to $T_N$, the above-described recovery method is limited to restoring data to one of the ends of the timeline, i.e. either to $T_O$ or to $T_N$, and cannot restore the data to a known good state at a point in time $T_X$ between $T_O$ to $T_N$. This ability to restore the data to the last known good state is important in many situations. For example, in an enterprise system within an electronic commerce site that handles many on-line transactions per second, it is desirable to get the system back up and running as quick as possible to minimize the amount of lost sales. Additionally, it is extremely important to be able to restore the data to the last known good state ($T_X$) so as not lose any of the transactions preceding the last known good state.

Additionally, the above-identified technology does not maintain a record or audit trail of the various computer commands, transactions or other relevant data that may be used for forensic or diagnostic applications. Merriam-Webster's Collegiate® Dictionary, Tenth Edition, describes "Forensic" as: relating to or dealing with the application of scientific knowledge to legal problems (~medicine) (~science) (~pathologist) (~experts). The term computer forensic application is a forensic investigation in which the computer was either the object of an activity or an instrument used in the activity under investigation. As used herein, the term computer forensic application includes, but is not limited to two investigative processes. The first forensic process enables an investigator to browse or otherwise investigate a target computer system beginning at time $T_0$, and then upon completion of the investigation, restore the target computer to time $T_0$. This may be accomplished using the technology described in application Ser. No. 09/258,413. The second forensic process involves maintaining an audit trail of hard drive transactions beginning at time $T_0$. Because the second process provides a comprehensive record of all hard disk write transactions and potentially other commands that enable an in depth recreation of a virus or other malicious attack, or other software failure with respect to the hard drive(s), it may be considered to be a diagnostic application. The second application also provides the capability of restoring a hard drive to a user-selected time or user-selected transaction $T_X$, and therefore can be considered to be a restoration process to a known state $T_X$. A "diagnostic application" provides a means for detecting faults in the system. Ideally, a diagnostic application detects or enables detection of faults early before they get too serious or to quickly identify that problem to be fixed.

This invention provides a computer system and method for maintaining an audit record for data restoration, forensic and diagnostic applications which is believed to constitute an improvement over the background technology.

BRIEF SUMMARY OF THE INVENTION

The present invention includes a storage device embodiment with an instantaneous storage restoration. The storage device with instantaneous restoration generally comprises a connector, a primary storage, and a secondary storage. The connector connects the storage device to a connection point of the computer. The primary storage has first data stored thereon, and is adapted for sending the first data to the computer in response to a corresponding read command received at the connection point. The secondary storage is adapted for storing second data in response to a corresponding write command received at the connection point and further is adapted for sending the second data to the computer in response to a corresponding read command received at the connection point. The present invention combines the above-identified storage device (i.e. one with instantaneous storage) with an audit trail storage that records a log of communication activity occurring at the connection point. For the purposes of the present application, the term "log of communication activity" includes but is not limited to each write command and corresponding write content, a time stamp, a checksum (error checking), other communication of concern for a forensic application, other communication activity of concern for a diagnostic application, and a memory location and controller status corresponding to each read command. Additionally, the term "log of communication activity" is intended to include not only the actual write commands and corresponding write content, but also the effect of each write command on the system. For example, in at least one embodiment, the log of communication activity records the old data replaced by the new data on the storage by each write command.

The invention includes a storage device embodiment without instantaneous restoration. The storage device includes a connector, a storage, and an audit trail. The connector connects the storage device to a connection point of the computer. The storage is adapted for storing data in response to a corresponding write command received at the connection point, and is further adapted for sending the data to the computer in response to a corresponding read command received at the connection point. The audit trail storage is adapted for recording a log of communication activity occurring at the connection point.

The invention may further be defined as a system, that includes in addition to the elements attributed to the storage device, a host device connected to the connection point. The host device may be a computer, or one or more components thereof, such as a processor. The system may incorporate the storage device with or without instantaneous storage restoration.

The invention further may be defined as a computer-implemented method for restoring storage using an instantaneous storage system ($T_0 \rightarrow T_X$). This method generally comprises the steps of: (a) in response to receiving a write command regarding a first data, storing the first data to a secondary storage; (b) in response to receiving a read command regarding a second data, determining whether the second data is stored on the secondary storage: (c) upon determining that the second data is stored on the secondary storage, reading the second data from the secondary storage; (d) upon determining that the second data is not stored on the secondary storage, reading the second data from a primary storage; and (e) in response to receiving a restore command, resetting the secondary storage to an initial state. The present invention combines the above-identified steps performed with respect to the instantaneous storage system with the steps of: (1) recording a log of communication activity occurring at a connection point between a host device, a primary storage and a secondary storage; and (2) also in response to receiving a restore command after resetting the secondary storage to an initial state, performing a forward restoration process by duplicating the communication activity occurring at the connection point to restore the secondary storage to a known state at a desired time.

The invention further may be defined as a computer-implemented method for restoration of storage without using an instantaneous storage system ($T_0 \rightarrow T_X$). This method generally comprises the steps of: (a) recording data from a storage to a backup storage to establish an initial state; (b) recording a log of communication activity occurring at a connection point between a host device and the storage; and (c) in response to a restore command, restoring the storage to the initial state by restoring data from the backup storage to the storage, and restoring the storage to a known state at a desired time by chronologically duplicating the communication signals using the log of communication activity.

Additionally, the present invention may be defined as a computer-implemented method for restoring a storage device to a known state $T_X$ without first restoring to an initial state $T_0$ ($T_X \leftarrow T_N$). This method generally comprises the steps of: (a) prior to writing new data to a memory location in a storage unit, reading the old data stored in the memory location; (b) writing the old data with header information into an audit trail storage; and (c) in response to a restore command, performing a reverse restoration process by writing the old data recorded in the audit trail back into the corresponding memory location in the storage beginning with the present state and ending with the known state.

Significant features of the invention include the ability to quickly restore an enterprise or other computer system after a failure, the ability to quickly recover and restore the data for that system to a point in time right before the failure occurred, and the ability to hide or otherwise protect the restoration system from virus or other malicious attacks.

The features, benefits and objects of this invention will become clear to those skilled in the art by reference to the following description, claims and drawings.

BRIEF DESCRIPTION OF THE SEVERAL VIEWS OF THE DRAWING

FIG. 1 is an illustration of an instantaneous software restoration system in which the host device sees each of the primary and secondary storages.

FIG. 2a is an illustration of an embodiment of an instantaneous restoration hardware system in which the host device sees each of the primary and secondary storages.

FIG. 2b is an illustration of an embodiment of an instantaneous restoration hardware system in which the restoration system is hidden from attack because the host device sees the controller as a single storage.

FIG. 3 is a simplified illustration of a computer system adapted for instantaneous restoration.

FIG. 5 is an illustration of the present invention with the software-implemented instantaneous restoration system of FIG. 1.

FIGS. 6a and 6b are illustrations of the present invention with the hardware-implemented instantaneous restoration system of FIGS. 2a and 2b respectively.

FIG. 7 is a simplified illustration of the computer system adapted for instantaneous restoration and for recording an audit trail.

FIG. 9a is an illustration of a software-implemented audit trail system without instantaneous restoration.

FIG. 9b is an illustration of a hardware-implemented audit trail system without instantaneous restoration in which the host device sees the audit trail storage, storage and backup storage as one storage device.

FIG. 9c is an illustration of a hardware-implemented audit trail system without instantaneous restoration in which the host device sees the audit trail storage and storage as one storage device, and further sees the backup storage.

FIG. 10 is an illustration of an audit trail method without instantaneous restoration.

FIG. 12 is a schematic illustrating the relationship between elements in an audit trail system with instantaneous restoration that is capable of forward restoration and, optionally, is also capable of reverse restoration.

FIG. 13 is a schematic illustrating the relationship between elements in an audit trail system capable of reverse restoration.

FIGS. 14a and 14b illustrate forward restoration and reverse restoration respectively.

FIG. 15 is an illustration of a hardware-implemented audit trail system without instantaneous restoration and adapted for reverse restoration.

FIGS. 16a and 16b illustrate examples of potential arrangements for the audit trail storage.

DETAILED DESCRIPTION

Figure 4:
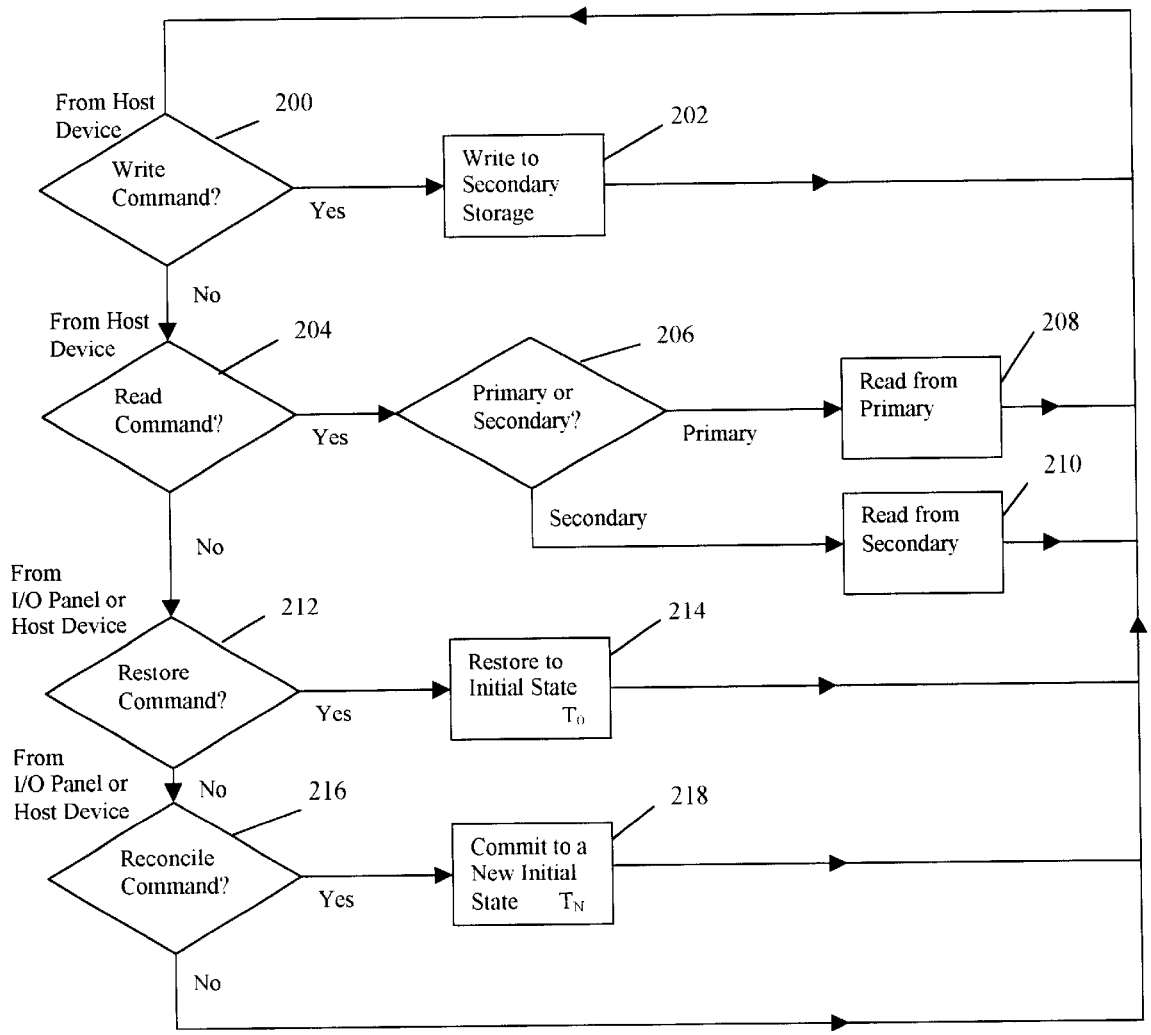
FIG. 4 is an illustration of the instantaneous restoration method.

Referring to the figures, examples of preferred embodiments of the present invention are illustrated and generally indicated by the reference numeral 10. The present invention is described below (1) in relation to a system and method for instantaneous storage restoration, (2) in relation to a system and method for an audit trail with instantaneous storage restoration, (3) in relation to a system and method for an audit trail without instantaneous storage restoration, and (4) in relation to forward and/or reverse restoration processes.

I. Instantaneous Storage Restoration

An instantaneous storage restoration system and method generally are illustrated in FIGS. 1–4.

A. Device/System.

The instantaneous storage restoration system includes a host device 100, a connection point 102, a primary storage 104, and a secondary storage 106. The host device 100 can be a computer, or one or more components thereof, such as a processor. The connection point 102 is the manner by which the host device 100 is connected to the primary storage 104 and the secondary storage 106, i.e. it operatively couples the host device 100 to each of the primary storage 104 and the secondary storage 106. As shown in the simplified illustration of a computer in FIG. 3 for the hardware system of FIG. 2b, the connection point 102 may include but is not limited to a bus, such as an IDE or SCSI bus as known in the art. The storage 104 and the storage 106 may have a connector between the two of them for connection to the connection point 102, such as an IDE or a SCSI cable connector. Additionally, it is anticipated that the connection point 102 may utilize the Internet global network through iSCSI, i.e. a draft of an open standard by Cisco and IBM to create a virtual bus that rides over the Internet.

Referring again to FIG. 3, a diagram of a computer in conjunction with which embodiments of the invention may be practiced is shown. For example, the computer of FIG. 3 can function as the host device 100 of FIG. 1. The computer comprises bus, keyboard interface, external memory, mass storage device and processor. The bus can be a single bus or a combination of multiple buses. The bus provides communication links between components in the computer, and in one embodiment functions as the connection point 102 of FIG. 1. The keyboard controller can be a dedicated device or can reside in another device such as a bus controller or other controller. The keyboard controller allows coupling of a keyboard to the computer system and transmits signals from a keyboard to the computer system.

The external memory can comprise a dynamic random access memory (DRAM) device, a static random access memory (SRAM) device, or other memory devices. The external memory stores information from mass storage device and processor for use by processor. The mass storage device can be a hard disk drive, a floppy disk drive, a CD-ROM device, or a flash memory device. In one embodiment, the mass storage device may encompass both the primary storage 104 and the secondary storage 106 of FIG. 1, as indicated by the dotted lines of the box 108 of FIG. 1. The mass storage device provides information to external memory. The processor can be a microprocessor and is capable of decoding and executing a computer program such as an application program or operating system with instructions from multiple instruction sets. The processor 404 can also be the host device 100 of FIG. 1.

Each of the primary storage 104 and the secondary storage 106 can be any type of one or more storage devices, including but not limited to a hard disk drive or other fixed storage device, a removable media drive, etc. As indicated by the dotted-line box 108 surrounding the storage 104 and the storage 106, the storages 104 and 106 may act as a single physical storage device as seen by the host device 100. For example, normally a single hard drive may be connected to the host device 100 via the connection point 102. Similarly, the storages 104 and 106 may be connected to the host device 100 via the connection point 102, as disposed in the same case, such that to the host device 100, the storages 104 and 106 appear as a single device.

Thus, FIGS. 1, 2a and 2b show a logical view of the storages, and does not necessarily represent an actual physical view of the storages. FIG. 1 may be viewed as a software embodiment completely controlled by software and virtual switches. Software applications include but are not limited to emulation and forensic applications. FIGS. 2a and 2b illustrate an instantaneous restoration hardware system. Rather than using virtual switches, solid state switches 116 and 118 may be used. These figures indicate that these switches may be housed in an Input/Output (I/O) Panel, although the invention is not so limited.

Figure 11A:
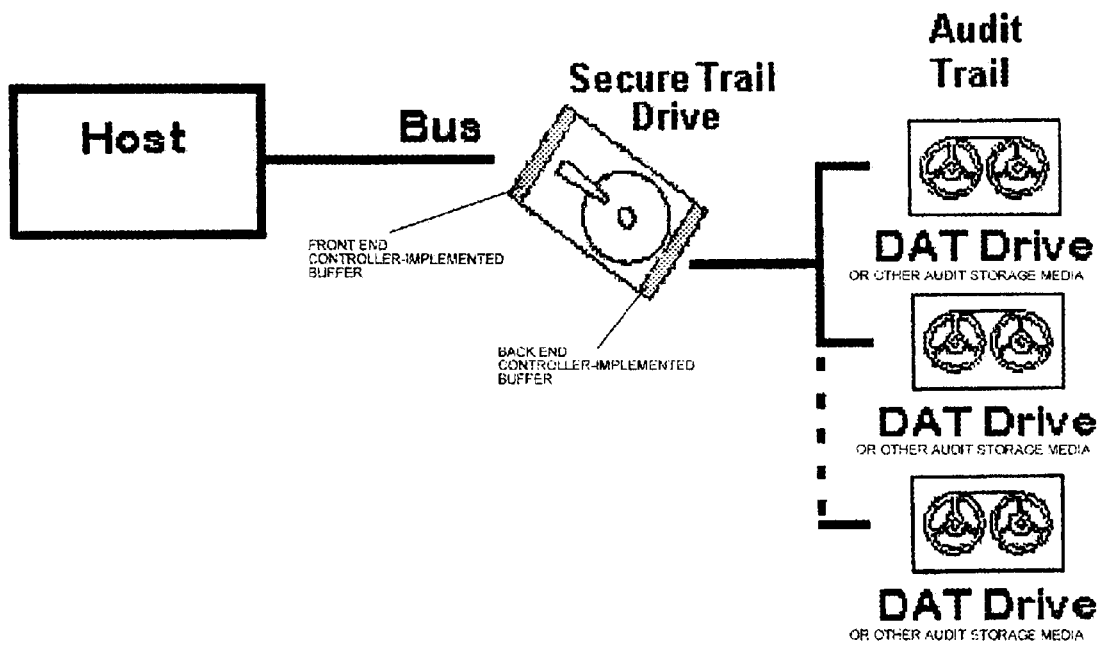
FIGS. 11a and 11b illustrates how the controller mimics a single storage device and prevents the host from seeing the other storage devices.
Figure 11B:
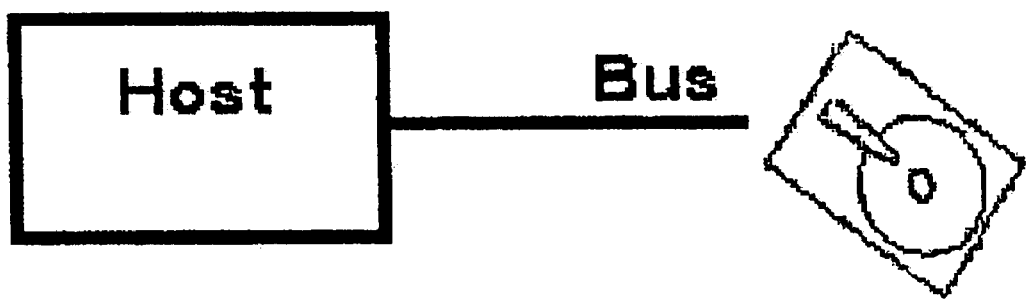

A desirable feature of the invention is illustrated in FIGS. 2b and 3; namely, the controller 112 isolates the storages 104 and 106 from the processor or host device 100. By isolating the storage device from the processor, the system is protected against virus and other malicious attacks because the processor only recognizes the controller as the storage device, and does not recognize the separate primary storage and secondary storage. This concept is illustrated in FIGS. 11a and 11b.

In particular, the connection point 102 may directly connect the host device 100 to the primary storage 104 and the secondary storage 106 as illustrated in FIG. 2a. Alternatively, the controller 110 may be positioned to intercept commands to the primary storage 104 and the secondary storage 106 as illustrated in FIG. 2b. The controller 110 is shown as separate from the storages 104 and 106, and in one embodiment, is a hardware controller, although the invention is not so limited. In one particular embodiment, the controller 110, and the storages 104 and 106, can be encased in the same physical device, such that the device itself plugs into the connection point 102. In another particular embodiment, however, the controller 110 is in a separate physical device from the storages 104 and 106.

The secondary storage 106 is mapped such that it has a corresponding block, sector, or other demarcable unit for every block, sector, or demarcable unit of the primary storage 104 (it may have more, however). This is so that a write command for data to be written to a given block or sector, for example, of the primary storage 104 can instead be written to a corresponding block or sector of the secondary storage 106. It is noted, too, that the physical considerations of the storages 104 and 106 are not an issue under the invention: in fact, the storages 104 and 106 can be part of the same physical storage device, such as a hard drive, can each or one be more than one physical storage device, can be a RAID storage device (as known within the art), etc. Importantly, the diagram of FIG. 4 shows a logical view of an embodiment of the invention, and not necessarily a physical view of the embodiment.

As has been already described, the controller 110 is in one embodiment a hardware controller. The controller 110 includes an in-memory map 112 (e.g., in random-access memory (RAM), synchronous dynamic RAM (SDRAM), etc., the invention is not so limited, however) that stores a complete index of all writes that have come from the host device 100. In one embodiment, this is accomplished by having a separate bit for every block, sector, cluster, or other demarcable unit of the primary storage 104 (and, correspondingly, for every corresponding block, sector, cluster or other demarcable unit of the secondary storage 106), such that when the bit is turned on (logical one), it indicates that a write has taken place thereto, and when the bit is off (logical zero), it indicates that no write has taken place thereto.

An initial state of the primary storage 104 and the secondary storage 106 is defined as the primary storage 104 having first data already written thereon, and the secondary storage 106 having no data written thereon. The bits of the map 112 corresponding to this first data being stored on blocks, sectors, clusters, or other demarcable units of the primary storage 104, however, are initially off, to indicate that no new data has been written to these blocks, sectors, etc. Subsequent to this initial state, an embodiment of the instantaneous storage restoration works as follows. When the host device 100 sends (second) data to the connection point 102 for writing on the device connected to the connection point 102 it sees as box 108 (for example, by sending an appropriate and corresponding write command including this second data, as known in the art), the controller 110 intercepts this command. The controller 110 sets the corresponding bit in the map 112 for the second data of the write command, and sends the data to be written on the secondary storage 106 rather than the primary storage 104 so that the secondary storage 106 actually stores the second data rather than the primary storage 504. That is, subsequent to the initial state, all writing of data by the host device I 00 through the connection point 102 is performed by the secondary storage 106.

When a read command is received over the connection point 102 for a particular piece of data, from the host device 100, the controller 110 intercepts the command, and has the primary storage 104 respond by sending this data to the host device 100 over the connection point 102 if the read command relates to any of the first data that it has stored thereon. Conversely, when a read command is received that relates to any of the second data that the secondary storage 104 has stored thereon, then the controller 110 has it respond, by sending the asked-for data to the host device 100 over the connection point 102. The controller 110 makes this determination by checking the map 112; if the map 112 has a bit set for the data requested in the read command, then this data is read from the secondary storage 106; otherwise, the data is read from the primary storage 104. Subsequent to the initial state, then, three situations are possible:

(1) If a write command is received at the connection point 102, the secondary storage 106 stores the data included therein;

(2) If a read command is received at the connection point 102 that relates to the (first) data stored on the primary storage 104, then the storage 104 responds to the command (unless updating of the secondary storage 106 has been occurring during a free bus cycle with this data, as is described later in the detailed description); and, (3) If a read command is received at the connection point 102 that relates to the (second) data stored on the secondary storage 106, then the storage 106 responds to the command.

Each of the switches 116 and 118 can be hardware or software. A hardware switch, for example, is a switch that is a real, physical switch operatively connected to the controller 110. A software switch is a virtual switch, implemented by software, that is actuated by issuance of a corresponding command by the host device 100 over the connection point 102. The invention is not limited to a switch of either type, however. It is noted that a hardware switch, however, provides for faster operation, and negates any security issues that can be present with a software switch, such as a hacker forcing reconciliation and restoration commands to the controller 110 when they are not desired, etc.

The switch 116, when actuated, instantly restores the secondary storage 106 to a state prior to which the second data was stored thereon. This is accomplished simply by erasing the map 112, such that all of the writes that have been performed by the secondary storage 106 are forgotten by the controller 110. That is, the switch 116 restores the two of the primary storage 104 and the secondary storage 106 such that the only data stored thereon between the two is the first data stored on the primary storage 104 at the definition of the initial state. The second data stored on the secondary storage 106 is forgotten. This means that restoration of the primary storage 104 and the secondary storage 106 is substantially instantaneous. Rather than restoring the initial state of the primary storage 104 from a previously made back up, the initial state can easily and quickly be restored to by deleting the data on or otherwise resetting the secondary storage 106, because the second data was stored on a separate secondary storage 106.

Furthermore, the switch 118, when actuated, resets the initial state of the primary storage 104 and the secondary storage 106 to their current state. This is done in one embodiment by the controller 108 copying the second data as has been stored on the secondary storage 106 (indicated by turned-on bits in the map 112) to the primary storage 104 (and subsequently turning off the bits in the map 112 as their corresponding block, sectors, etc., of data have been copied from the secondary storage 106 to the primary storage 104), establishing a new initial state. The secondary storage 106 is considered "reset," when the map 112 is completely zeroed by changing all the bits thereof corresponding to sectors, clusters, etc. to logical zero. Thus, the new "first data" on the primary storage 104 is the previous first data and the second data as has been recently copied to the primary storage 104. The secondary storage 106 is then ready to accept new data as received at the connection point 102 from the host device 100, such that actuation of the switch 116 results in restoration of the primary storage 104 and the secondary storage 106 to the newly established initial state now defined to include the previous first data and the previous second data, and to exclude any new data that may have been written to the secondary storage 106 subsequent to the previous second data.

Other embodiments of the invention are anticipated to quickly establish a new initial state. For example, during free bus cycles of the connection point 102 (or, just "free cycles" in the case where the point 102 is not necessarily a bus)—defined generally as when the host 500 is not sending write or read commands over the point 102, such that the point 102 (e.g., a bus) is "quiet"—the sectors, blocks, clusters, or other demarcable units of the primary storage 104 having the first data stored thereon are copied by the controller 110 to their corresponding sectors, etc., of the secondary storage 106. In conjunction with this copying, bits corresponding to these sectors, etc., within the memory map 112 are turned on to logical one, to indicate that the secondary storage is having this first data copied thereto. Ultimately, if there are sufficient free bus cycles, all of the first data on the primary storage 104 is copied to the secondary storage 106, such that the primary storage 104 has the first data stored thereon, and the secondary storage 106 has the first data and any second data stored thereon.

In this particular embodiment, when the reconciliation switch 118 is actuated, the controller 110 makes a determination as to the quickest process by which reconciliation can occur. The controller 110 must decide whether copying the second data from the secondary storage 106 to the primary storage 104 to establish a new initial state will be quicker, or whether copying any remaining first data from the primary storage 104 to the secondary storage 106, that has not already been copied to the secondary storage 106, will be quicker. This decision in one embodiment is made simply by comparing the amount of second data that would need to be copied from the secondary storage 106 to the primary storage 104 with the amount of first data that still needs to be copied from the primary storage 104 to the secondary storage 106, it is assumed that the lesser amount of data to be copied results in the faster reconciliation.

In the case where copying the second data from the secondary storage 106 to the primary storage 104 is deemed quicker, then reconciliation is accomplished as has been described already: the second data is copied, and the map 112 is erased to reset the secondary storage 106 (i.e., forget the data stored on the storage 106). A new initial state is thus established. However, in the case where copying the remaining first data from the primary storage 104 to the secondary storage 106 is deemed quicker, reconciliation is performed as follows. First, the remaining first data—if any—from the primary storage 104 to the secondary storage 106 is copied. Next, the roles of the storages 104 and 106 are switched, such that the storage 106 becomes the new primary storage and the storage 104 becomes the new secondary storage. Finally, the map 112 is again erased to reset the new secondary storage (the former primary storage 104), to forgot the data stored on the new secondary storage. A new initial state is thus established; any new data to be written as sent from the host device 100 is saved on the new secondary storage (the former primary storage 104), such that the map 112 keeps track of data saved to this new secondary storage. Operation thus proceeds as has been previously described, except that the roles of the storages 104 and 106 are reversed.

B. Method.

Referring now to FIG. 4, a computer-implemented method for instantaneously restoring a storage is illustrated. This computer-implemented method may be, but is not required to be, implemented via software through one or more programs executed from a machine-readable medium such as a memory by a processor of a computer. The programs preferably are adapted to be distributed on a machine-readable medium such as a floppy disk or a CD-ROM or to be distributed over the Internet, and to be installed and executed on a computer.

The method of FIG. 4 starts with an initial state such that first data is stored on a primary storage, and no data is stored on a secondary storage. Then, in 200, it is determined whether a write command has been received from a host device, at a connection point thereof. If a write command has been received, the method proceeds to 202, and the (second) data that is the subject of the write command is written to the secondary storage; the method then goes back to 200. If instead of a write command, a read command is received in 204, the method proceeds to 206, and it is determined whether first data is the subject of the read command (as stored on the primary storage), or if second data is the subject of the read command (as stored on the secondary storage). If the former, then in 208 the primary storage responds to the read command, and the data is read from the primary storage for sending to the host device via the connection point. If the latter, then in 210 the secondary storage responds to the read command, and the data is read from the secondary storage for sending to the host device via the connection point. In either case, the method returns to 200.

If instead of a read or write command, a restore or reconcile command is received at 212 either by actuation of a software switch in the host device or actuation of a hardware switch in the I/O panel, then the method proceeds to 214 where the primary and the secondary storage are reset or restored to their initial state $T_0$. That is, the secondary storage is reset or the second data stored thereon is otherwise erased or forgotten, and the only data stored between the primary and the secondary storage is the first data still on the primary storage. The method then returns to 200. If instead of a restore command, a reconcile command is received at 216, then the method goes from 218 where a new initial state is established, by, for example, copying the second data to the primary storage from the secondary storage, and then resetting the (initial state of the) secondary storage or otherwise erasing or forgetting the second data stored thereon. Alternatively, the roles of the primary and secondary storage may be swapped it, during free cycles, first data from the primary storage is copied to the secondary storage Thus, a subsequent reset command will reset the state of the primary and the secondary storage to the state where the primary storage is storing the first and the second data (that is, the newly established initial state), and any subsequent data is deleted from the secondary storage. The method then proceeds back to 200.

II. Audit Trail With Instantaneous Storage Restoration.

One embodiment of the present invention includes combining an audit trail with the above-described instantaneous storage restoration.

A. Device/System.

The instantaneous storage restoration system generally includes (1) a connector 102 adapted for connecting the storage device 10 to a connection point of the computer, (2) a primary storage 104 having first data stored thereon (at the state $T_0$, for example), and adapted for sending the first data to the computer in response to a corresponding read command received at the connection point, and (3) a secondary storage 106 adapted for storing second data in response to a corresponding write command received at the connection point and further adapted for sending the second data to the computer in response to a corresponding read command received at the connection point. The audit trail storage 120 is adapted for recording a log of communication activity occurring at the connection point.

As described above, a desirable feature of the invention is illustrated in FIGS. 2b and 3; namely, the controller 112 isolates the storages 104 and 106 from the processor or host device 100. By isolating the storage device from the processor, the system is protected against virus and other malicious attacks because the processor only recognizes the controller as the storage device, and does not recognize the separate primary storage and secondary storage. This concept is illustrated in FIGS. 11a and 11b.

Also as described above in more detail, the storage device 10 may further comprise a controller 110 adapted for controlling the primary storage 104 and the secondary storage 106. The controller 110 preferably includes a map 112 for tracking the second data received at the connection point and stored on the secondary storage 106. Further, the storage device 10 may comprise a restore switch 116 to instantly restore the secondary storage to an initial state prior to which the second data was stored thereon. The switch 116 may comprise a hardware switch, as illustrated in the I/O Panels of FIGS. 6a and 6b, or a virtual switch implemented via software, wherein a command received at the connection point actuates the switch, as illustrated in FIG. 5.

Additionally, the storage device 10 may further comprise a reconcile switch 118 to establish a new initial state. In one embodiment, the new initial state may be established by copying the second data from the secondary storage to the primary storage. In another embodiment, the first data is copied from the primary storage to the secondary storage during free cycles, and the new initial state is established by copying any of the first data from the primary storage to the secondary storage that has not already been copied to the secondary storage. Once again, the switch 118 may comprise a hardware switch or a virtual switch implemented via software, wherein a command received at the connection point actuates the switch.

And as described in more detail above, the connection point for the storage device may comprise a connector for a bus of the computer. Furthermore, the primary storage and the secondary storage may include one or more fixed storage devices and/or one or more removable media storage devices.

The audit trail storage is adapted for recording a log of communication activity chronologically beginning at a first state $T_0$ and ending a second state $T_N$. The log of communication activity recorded by the audit trail storage may include a variety of information used for data recovery, forensic and diagnostic applications. For example, the log of communication activity may include, but is not limited to one or more of the following: each write transaction and corresponding write content occurring at the connection point, a time stamp and checksum, other communication activity of concern for a forensic application; other communication activity of concern for a diagnostic application; and both a memory location and a controller status corresponding to each read command received at the connection point.

In one embodiment, the audit trail storage is further adapted for performing a forward restoration of the primary storage from the first state (at $T_0$, for example) a known state $(T_X)$ at a desired time after the first state by duplicating the communication activity that occurred at the connection point from the first state to the desired time after the first state. The duplicated communication activity includes each write transaction and corresponding write content that occurred at the connection point from the first state to the desire time after the first state. Therefore, this system can be reconciled to the current state $T_N$, restored to state $T_0$, or restored to a known state $T_X$ between $T_O$ and $T_N$. The forward restoration process is generally illustrated in FIG. 12, and is discussed in more detail below. The audit trail storage may restore the secondary storage to within a user-selected granularity of time. In one embodiment, the audit trail storage is adapted for listing all write commands issued within the user-selected granularity of time and for enabling restoration of the primary storage to a selected write command. Alternatively, the primary storage may be restored to a selected time.

Finally, the audit trail storage may be adapted for also performing a reverse restoration of the secondary storage from a present state $T_N$ to a known state $T_X$ at a desired time prior to the present state by recording old data from a memory location in the secondary storage in which new data is written, and in response to a restore command, rewriting the old data over the new data in the memory location. The reverse restoration process is generally illustrated in FIG. 13, and is described in more detail below.

Similar to the primary 104 and secondary storage 106, the audit trail storage 120 may include one or more fixed storage devices and/or one or more removable media storage devices. In a preferred embodiment, the audit trail storage includes DAT media. The specific DAT media is not an issue in the present invention. Examples of DAT Tapes include the following non-exhaustive list: (1) Mini-QIC Tapes such as QIC-40, QIC-80, QIC-3010, QIC-3020, TR2, TR3, and TR4; (2) ¼" tapes such as PE-1066, PE-1600, QIC-11, QIC-24, QIC-120, QIC-150, QIC-525, QIC-1000, QIC-1.2G, QIC-, 350, and QIC-1.6G; (3) IBM 3480/3490 such as DCT-3510/3480; and (4) DCT-3511/C/3490E; 4MM DAT such as DDS-1/60 Meter, DDS-1/90 Meter, DDS-2, DDS-3, DDS-4; and (5) 8MM DAT (Exabyte) such as 8200, 8200C, 8500, 8500C, Mammoth LT, Mammoth, Mammoth-2.

FIGS. 16a and 16b illustrate that the audit trail storage 120 may take on various forms to accommodate both management and higher throughput concerns. For example, once an audit media get full or mostly full, the controller may begin to store data on a second audit storage media to enable a user to swap or otherwise pull a tape without interrupting the process of storing the data on in the audit trail storage 120. Additional tapes may be used for the ease of managing the full tapes. Further, as higher hard disk speeds are attained, data throughput to the audit storage may become an issue. One method for obtaining higher data throughput to match the hard disks is to use a juke box arrangement in which the controller records information to several different storage media, and keeps track of where that information is stored.

B. Method.

Figure 8:
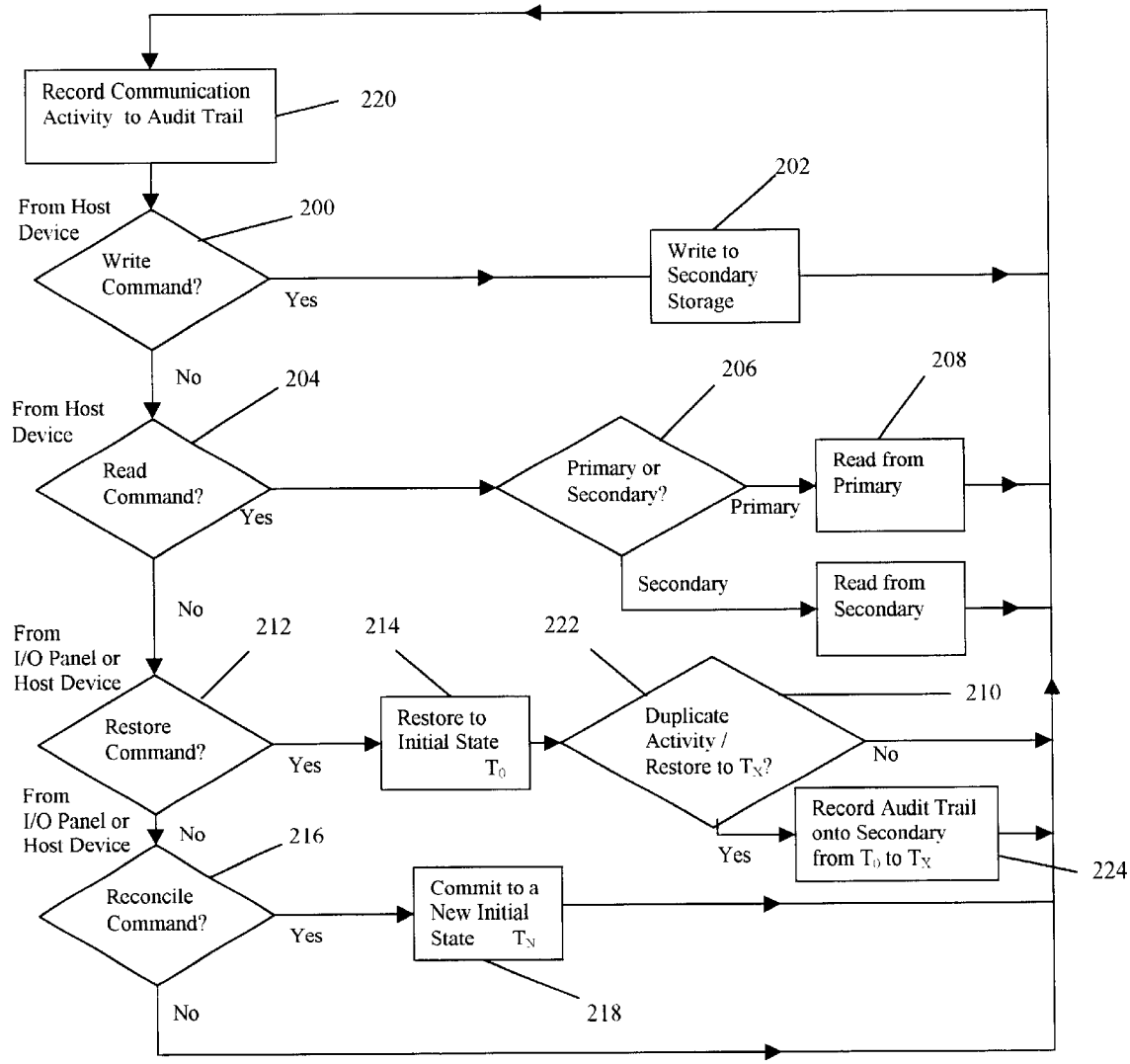
FIG. 8 is an illustration of an audit trail and instantaneous restoration method.

The use of the above described device and system combines steps in the method of using an instantaneous storage restoration system with steps in the method of using and audit trail system. The method of using an instantaneous storage restoration system, as illustrated in FIG. 8, generally includes the steps of: (a) in response to receiving a write command at 200 regarding a first data, storing the first data to a secondary storage at 202, (b) in response to receiving a read command regarding a second data at 204, determining whether the second data is stored on the secondary storage at 206; (c) upon determining that the second data is stored on the secondary storage at 206, reading the second data from the secondary storage at 208; (d) upon determining that the second data is not stored on the secondary storage at 206, reading the second data from a primary storage at 210; and (e) in response to receiving a restore command at 216, resetting the secondary storage to an initial state at 218. The method of using an audit trail system generally comprises the steps of: (a) at 220, recording a log of communication activity occurring at a connection point between a host device, a primary storage and a secondary storage; and (b) also in response to receiving a restore command at 212 after resetting the secondary storage to an initial state at 214, performing a forward restoration process at 222 as illustrated by FIG. 12 by duplicating the communication activity occurring at the connection point to restore the secondary storage to a known state at a desired time at 224.

The method may further comprise the steps of in response to receiving a reconcile command at 216, establishing a new initial state and resetting the initial state of the secondary storage. The step of recording a log of communication activity at 220 may include the steps of: recording each write transaction and corresponding write content, recording a time stamp and a checksum (error checking) for each transaction; and recording other communication activity of concern for either forensic or diagnostic applications. In at least one embodiment in which reverse restoration is desired, the step of recording a log of communication activity at 220 further may include the steps of (i) prior to writing new data to a memory location in the secondary storage, reading old data stored in the memory location; and (ii) recording the old data and header information to the audit trail. Alternatively in response to receiving a restore command, a reverse restoration process may be performed by writing the old data recorded in the audit trail back into the corresponding memory location in the secondary storage beginning with the present state and ending with the known state. This reverse restoration is illustrated in FIG. 13.

III. Audit Trail Without Instantaneous Storage Restoration.

Another embodiment of the present invention, as generally illustrated in FIGS. 9–10 and 15, includes an audit trail without the above described instantaneous storage restoration.

A. Device/System.

The storage device of this embodiment generally includes: (a) a connector 102 connecting the storage device to a connection point of the computer; (b) a storage 122 adapted for storing data in response to a corresponding write command received at the connection point and further adapted for sending the data to the computer in response to a corresponding read command received at the connection point, and (c) an audit trail storage 120 adapted for recording a log of communication activity occurring at the connection point.

In this embodiment, the storage device may further comprising a backup storage 124 to copy and store data from the storage in response to a corresponding backup command received at the connection point and thereby establish an initial state. The audit trail storage 120 is adapted for recording the log of communication activity chronologically beginning at a first state $T_0$ and ending at a second state $T_N$. As described above, the log of communication activity may include one or more of the following: each write transaction and corresponding write content occurring at the connection point; a time stamp and checksum; other communication activity of concern for a forensic application; other communication activity of concern for a diagnostic application; and both a memory location and a controller status corresponding to each read command received at the connection point.

The audit trail storage is further adapted for performing a forward restoration of the storage from the initial state $T_0$ to a known state $T_X$ at a desired time after the initial state by duplicating the communication activity that occurred at the connection point. The duplicated communication activity includes each write transaction and corresponding write content that occurred at the connection point from the first state to the desire time after the first state. The audit trail storage is adapted for restoring the secondary storage to within a user-selected granularity of time with respect to $T_X$. One method for restoring the secondary storage to within the user-selected granularity of time is to list all write commands issued within the user-selected granularity of time and enable restoration of the primary storage to a selected write command.

The audit trail storage 120 also may be adapted for performing a reverse restoration of the secondary storage from a present state to a known state at a desired time prior to the present state by recording old data from a memory location in the secondary storage in which new data is written and by rewriting the old data over the new data in the memory location.

As illustrated in FIGS. 9b and 9c, the audit trail storage may be designed and positioned to intercept the communication activity before the communication activity is received by the storage, to monitor or copy the communication activity as it passes through to the storage. In FIG. 9b, the host device only sees the controller as a single storage, and does not see the storage and the audit trail storage or the backup storage. This is a very secure arrangement. In FIG. 9c, the host device sees the backup storage, but does not see the separate audit trail storage and storage.

B. Method.

As illustrated in FIG. 10, the use of the above described device and system includes the steps of: (a) recording data from a storage to a backup storage to establish an initial state $T_0$ at 212; (b) recording a log of communication activity occurring at a connection point between a host device and the storage at 230, and (c) in response to a restore command, restoring the storage to the initial state by restoring data from the backup storage to the storage, and restoring the storage to a known state at a desired time by chronologically duplicating the communication signals using the log of communication activity at 224.

The method may further include the step of: (d) in response to a reconcile command at 216, committing to a new initial state at 218 using a forward restoration process by recording data from storage to the backup storage, and resetting the log of communication activity to begin recording at the new initial state.

The step of recording a log of communication activity may include the steps of (i) prior to writing new data to a memory location in the secondary storage, reading old data stored in the memory location, and (ii) recording the old data and header information to the audit trail. This method further comprises the step of: alternatively in response to receiving a restore command, performing a reverse restoration process by writing the old data recorded in the audit trail back into the corresponding memory location in the storage beginning with the present state and ending with the known state.

IV. Forward and Reverse Restoration Processes.

As indicated above, the present invention may perform a forward restoration process, a reverse restoration process, or both a forward and reverse restoration process.

A. Forward Restoration.

The forward restoration process is generally illustrated in FIG. 14a, which shows a time line running from $T_0$, through $T_0'$ and $T_N$, to $T_N$. $T_0'$ is the initial state. $T_0'$ represents the last known reconciled state. This may be the result of a successful reconcile command for an instantaneous storage restoration (see FIG. 5), or may the be result of a successful backup of the data (see FIG. 9a). As such, $T_0$ and $T_0'$ function as a known starting reference. Upon restoring the storage to the known starting reference, all the write commands recorded in the audit trail storage are copied to the storage until the desired time $T_X$. FIG. 8 illustrates the forward restoration method in conjunction with an instantaneous restoration, and FIG. 10 illustrates the forward restoration method in conjunction with a backup storage, i.e. without instantaneous restoration.

B. Reverse Restoration.

Figure 17A:
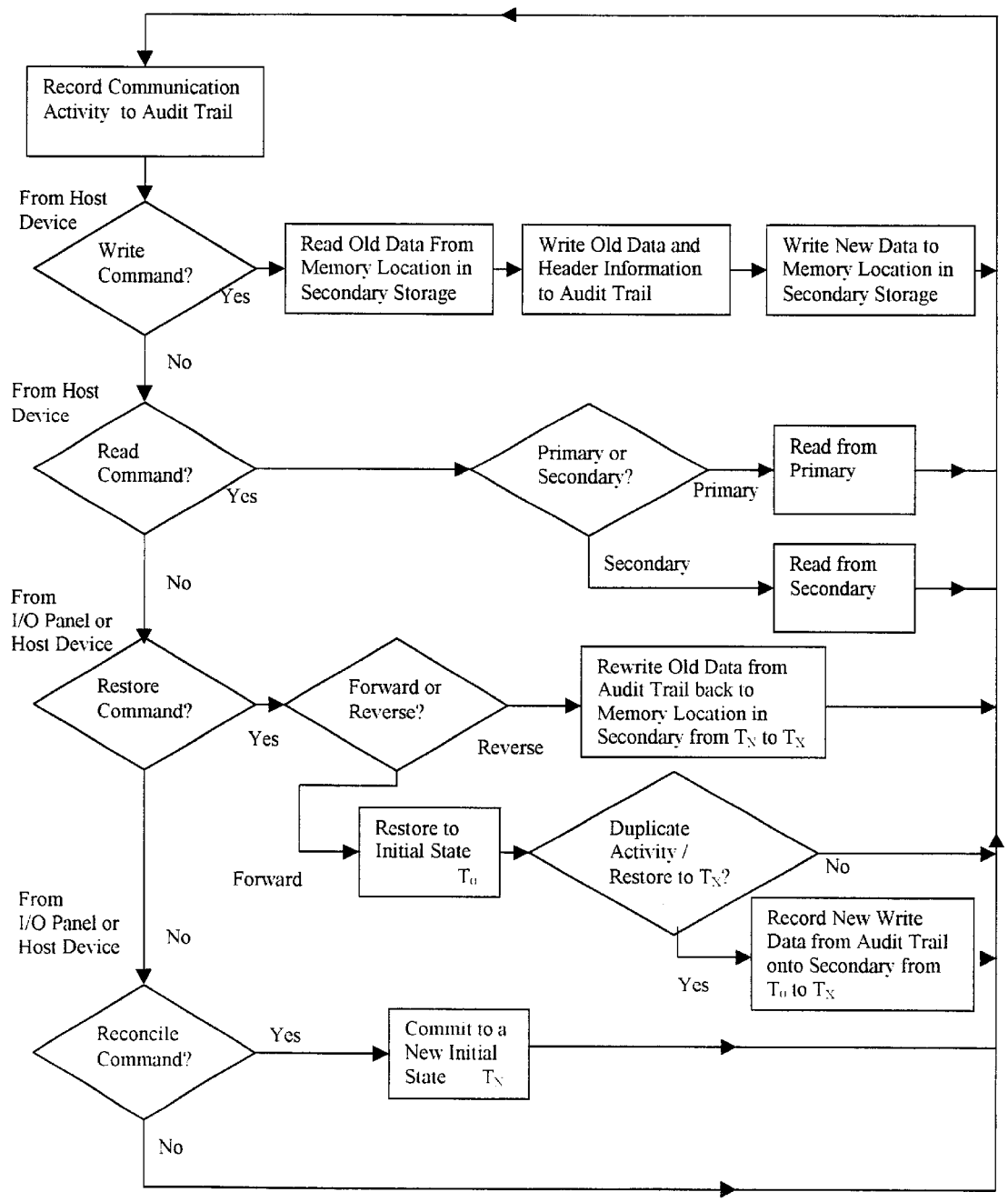
FIG. 17a illustrates an audit trail and instantaneous restoration method with both forward and reverse restoration.
Figure 17B:
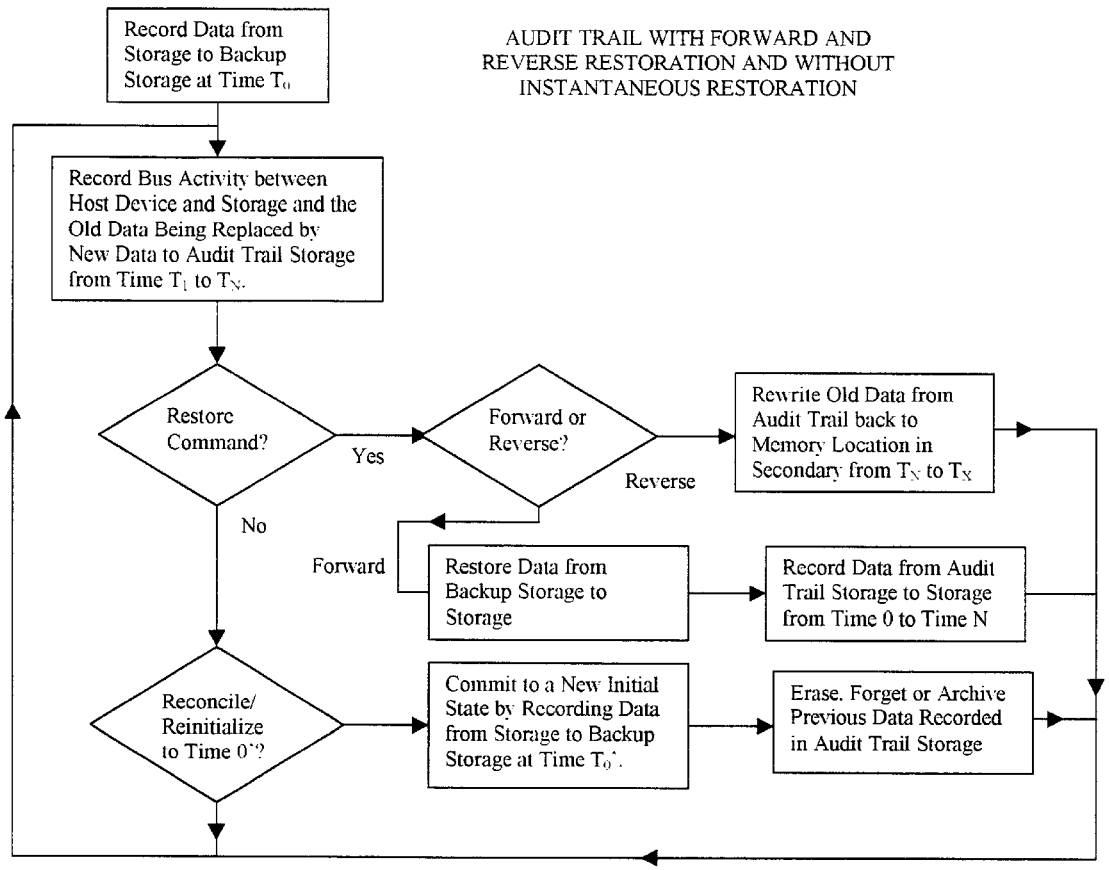
FIG. 17b illustrates an audit trail method without instantaneous restoration and with both forward and reverse restoration.
Figure 17C:
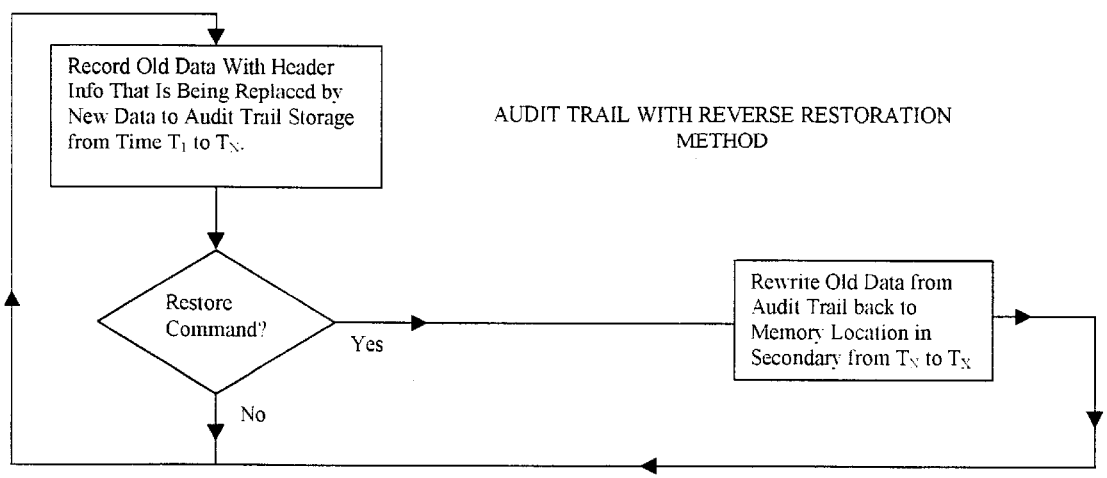
FIG. 17c illustrates a method of using the audit trail system with reverse restoration.

The forward restoration process is generally illustrated in FIG. 14b, which shows a time line running through $T_X$ to $T_N$. It should be noted that the initial state $T_0$ is not of concern for a reverse restoration only application. In general, the reverse restoration process begins at the present state $T_N$, and removes the last write commands by rewriting the replaced data over the newly written data until the state $T_X$ is reached. The log of communication activity recorded by the audit trail is, in the situation in which reverse restoration is desired, entails the following: in response to each write command to storage, recording the previous data recorded on the storage onto the audit trail along with the appropriate header information. As illustrated in FIG. 17c, this is the only information required to be recorded in the audit trail if the system only is designed for reverse restoration. The system for reverse restoration from the present state to a known state is illustrated in FIG. 13.

This method generally comprises the steps of: (a) prior to writing new data to a memory location in a storage unit, reading the old data stored in the memory location; (b) writing the old data with header info into an audit trail storage; and (c) in response to a restore command, performing a reverse restoration process by writing the old data recorded in the audit trail back into the corresponding memory location in the storage beginning with the present state and ending with the known state.

C. Forward and Reverse Restoration.

It is anticipated that there are situations in which it is desired to be able to perform both forward and reverse restorations. For example, it may be desired to pull "archives" of the data at intermediate times $T_0$ anyway, and the errors or problems that are may encountered may not be discovered for a considerable period of time. Therefore, it may be quicker to perform a forward restoration from the last known reconciled state. However, the error or problem may be discovered almost immediately. In this situation, it would be quicker to perform a reverse restoration from the present state. FIGS. 17a and 17b generally illustrate methods for performing both forward and reverse restorations within a context of a system with instantaneous restoration and without instantaneous restoration respectively. This system is generally illustrated in FIG. 12.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A storage device comprising:
   a connector connecting the storage device to a connection point of a computer,
   a primary storage having first data stored thereon, the primary storage being adapted for sending the first data to the computer in response to a corresponding read command received at the connection point,
   a secondary storage adapted for storing second data in response to a corresponding write command received at the connection point and further adapted for sending the second data to the computer in response to a corresponding read command received at the connection point, and
   an audit trail storage adapted for recording a log of communication activity occurring at the connection point, wherein the connection point comprises a connector for a bus of the computer.

2. The storage device of claim 1, further comprising a controller adapted for controlling the primary storage and the secondary storage, the controller including a map for tracking the second data received at the connection point and stored on the secondary storage.

3. The storage device of claim 1, further comprising a switch to instantly restore the secondary storage to an initial state prior to which the second data was stored.

4. The storage device of claim 3, wherein the switch comprises a hardware switch.

5. The storage device of claim 3, wherein the switch comprises a virtual switch implemented via software, such that actuation of the switch comprises receiving a command at the connection point.

6. The storage device of claim 1, further comprising a switch to establish a new initial state.

7. The storage device of claim 6, wherein the new initial state is established by copying the second data from the secondary storage to the primary storage.

8. The storage device of claim 6, wherein during free cycles the first data is copied from the primary storage, the new initial state being established by copying any of the first data from the primary storage to the secondary storage that has not lady been copied to the secondary storage.

9. The storage device of claim 6, wherein the switch comprises a hardware switch.

10. The storage device of claim 6, wherein the switch comprises a virtual switch implemented via software, such that actuation of the switch comprises receiving a command at the connection point.

11. The storage device of claim 1, wherein each of the primary storage and the secondary storage is selected from a group essentially consisting of: at least one fixed storage device, and at least one removable media storage device.

12. The storage device of claim 1, wherein the audit trail storage is adapted for recording a log of communication activity chronologically beginning at a first state and ending a second state.

13. The storage device of claim 12, wherein the log of communication activity recorded by the audit trail storage includes each write transaction and corresponding write content occurring at the connection point.

14. The storage device of claim 13, wherein the log of communication activity recorded by the audit trail storage includes a time stamp and checksum.

15. The storage device of claim 14, wherein the log of communication activity recorded by the audit trail storage further includes other communication activity of concern for a forensic application.

16. The storage device of claim 14, wherein the log of communication activity recorded by the audit trail storage further includes other communication activity of concern for a diagnostic application.

17. The storage device of claim 13, wherein the log of communication activity further includes both a memory location and a controller status corresponding to each read command received at the connection point.

18. The storage device of claim 12, wherein the audit trail storage is fiber adapted for performing a forward restoration of the primary storage from the first state to a known state at a desired time after the first state by duplicating the communication activity that occurred at the connection point from the first state to the desired time after the first state.

19. The storage device of claim 18, wherein the duplicated communication activity includes each write transaction and corresponding write content that occurred at the connection point from the first state to the desired time after the first state.

20. The storage device of claim 18, wherein the audit trail storage is adapted for restoring the secondary storage to within a user-selected granularity of time.

21. The storage of claim 20, wherein the audit trail storage is adapted for listing all write commands issued within the user-selected granularity of time and for enabling restoration of the primary storage to a selected write command.

22. The storage device of claim 18, wherein the audit trail storage is flier adapted for performing a reverse restoration of the secondary storage from a present state to the known state at the desired time prior to the present state by recording old data from a memory location in the secondary storage in which new data is written and by rewriting the old data over the new data in the memory location.

23. The storage device of claim 12, wherein the audit trail storage is selected from a group essentially consisting of: at least one fixed storage device, and at least one removable media storage device.

24. The storage device of claim 23, wherein the audit trail storage includes DAT media.

25. A comprising:
  a connector connecting the device to a connection point of a computer, a primary storage having first data stored thereon, the primary storage being adapted for sending the first data to the computer in response to a corresponding read command received at the connection point,
  a secondary storage adapted for storing second data in response to a corresponding write command received at the connection point and father adapted for sending the second data to the computer in response to a corresponding read command received at the connection point,
  a switch to restore the secondary storage to an initial state prior to which the second data was stored thereon, and
  an audit trail storage adapted for recording a log of communication activity occurring at the connection point chronologically beginning at the initial state and ending at a second state, the log of communication activity including each write transaction and corresponding write content, tune stamp and checksum occurring at the connection point, the audit trail storage further being adapted for restoring the primary storage from the initial state to a known state at a desired time after the initial state by duplicating the communication activity that occurred at the connection point from the initial state to the desired time after the initial state at the connection point.

26. A storage device for a computer, comprising:
  a. a connector connecting the storage device to a connection point of the computer,
  b. a storage adapted for storing data in response to a corresponding write command received at the connection point and further adapted for sending the data to the computer in response to a corresponding read command received at the connection point; and
  c. an audit trail storage adapted for recording a log of communication activity occurring at the connection point, wherein the connection point comprises a connector for a the computer.

27. The storage device of claim 26, further comprising a backup storage to copy and store data from the storage in response to a corresponding backup command received at the connection point and thereby establish an initial state.

28. The storage device of claim 26, wherein the audit trail storage is adapted for recording the log of communication activity chronologically beginning at a first state and ending at a second state.

29. The storage device of claim 28, wherein the log of communication activity recorded by the audit trail storage includes each write transaction and corresponding write content occurring at the connection point.

30. The storage device of claim 29, wherein the log of communication activity recorded by the audit trail storage includes a time stamp and checksum.

31. The storage device of claim 30, wherein the log of communication activity includes other communication activity of concern for a forensic application.

32. The storage device of claim 30, wherein the log of communication activity includes other communication activity of concern for a diagnostic application.

33. The storage device of claim 29 wherein the log of communication activity recorded by the audit trail storage includes both a memory location and a controller status corresponding to each read command received at the connection point.

34. The storage device of claim 28, wherein the audit trail storage is further adapted for performing a forward restoration of the storage from the first state to a known state at a desired time after the first state by duplicating the communication activity that occurred at the connection point.

35. The storage device of claim 34, wherein the duplicated communication activity includes each write transaction and corresponding write content that occurred at the connection point from the first state to the desired time after the first state.

36. The storage device of claim 34, wherein the audit trail storage is adapted for restoring a secondary storage to within a user-selected granularity of time.

37. The storage device of claim 36, wherein the audit trail storage is adapted for listing all write commands issued within the user-selected granularity of time and for enabling restoration of a primary storage to a selected write command.

38. The storage device of claim 34, wherein the audit trail storage is further adapted for performing a reverse restoration of the a secondary storage from a present state to the known state at the desired time prior to the present state by recording old data from a memory location in the secondary storage in which new data is written and by rewriting the old data over the new data in the memory location.

39. The storage device of claim 28, wherein the audit trail storage is selected from the group of at least one fixed storage device, and at least one removable media storage device.

40. The storage device of claim 39, wherein the audit trail storage includes DAT media.

41. The storage device of claim 28, wherein the audit trail storage intercepts the communication activity before the communication activity is received by the storage.

42. The storage device of claim 28, wherein the audit trail storage passes the communication activity through to the storage.

43. The storage device of claim 26, wherein the audit trail storage is adapted for performing a reverse restoration of a secondary storage from a present state to a known state at a desired time prior to the present state by recording old data from a memory location in the secondary storage in which new data is written and by rewriting the old data over the new data in the memory location.

44. A storage device for a computer, comprising:
   a connector connecting the storage device to a connection point of the computer;
   a storage adapted for storing data in response to a corresponding write command received at the connection point and further adapted for sending the data to the computer in response to a corresponding read command received at the connection point, wherein the connection point comprises a connector for a bus of the computer;
   a backup storage to copy and store data from the storage in response to a corresponding backup command received at the connection point and thereby establish an initial state; and
   an audit trail storage adapted for recording a log of communication activity occurring at the connection point and further being adapted for restoring the storage to a known state at a desired time by duplicating the communication activity that occurred at the connection point.

45. A system comprising:
   a host device,
   a connection point at the host device,
   a primary storage having first data stored thereon and adapted for sending the first data to the host device in response to a corresponding read command received at the connection point from the host device, and
   a secondary storage adapted for storing second data in response to a corresponding write command including the second data received at the connection point from the host device, and Her adapted for sending the second data to the host device in response to a corresponding read command received at the connection point from the host device, and
   an audit trail storage adapted for recording a log of communication activity occurring at the connection point, wherein the connection point comprises a connector for a bus of the host device.

46. The storage device of claim 45, wherein the audit trail storage is adapted for recording a log of communication activity chronologically beginning at a first state and ending a second state.

47. The storage device of claim 46, wherein the log of communication activity recorded by the audit trail storage includes each write transaction and corresponding write content occurring at the connection point.

48. The storage device of claim 46, wherein the audit trail storage is further adapted for performing a forward restoration of the primary storage from the first state to a known state at a desired time after the first state by duplicating the communication activity that occurred at the connection point from the first state to the desired time after the first state.

49. The storage device of claim 48, wherein the audit trail storage is further adapted for performing a reverse restoration of the secondary storage from a present state to the known state at the desired time prior to the present state by recording old data from a memory location in the secondary storage in which new data is written and by rewriting the old data over the new data in the memory location.

50. A system, comprising:
   a host device;
   a connection point at the host device;
   a storage adapted for storing data in response to a corresponding write command received at the connection point and flier adapted for sending the data to the computer in response to a corresponding read command received at the connection point; and
   an audit trail storage adapted for recording a log of communication activity occurring at the connection point, wherein the connection point comprises a connector for a bus of the host device.

51. The system of claim 50, further comprising a backup storage to copy and store data from the storage in response to a corresponding backup command received at the connection point and thereby establish an initial state.

52. The system of claim 50, wherein the audit trail storage is adapted for recording the log of communication activity chronologically beginning at a first state and ending at a second state.

53. The system of claim 52, wherein the log of communication activity recorded by the audit trail storage includes each write transaction and corresponding write content occurring at the connection point.

54. The system of claim 52, wherein the audit trail storage is further adapted for performing a forward restoration of the storage from the first state to a known state at a desired time after the first state by duplicating the communication activity that occurred at the connection point.

55. The system of claim 54, wherein the audit trail storage is further adapted for performing a reverse restoration of a secondary storage from a present state to the known state at the desired time prior to the present state by recording old data from a memory location in the secondary storage in which new data is written and by rewriting the old data over the new data in the memory location.

56. The system of claim 50, wherein the audit trail storage is adapted for performing a reverse restoration of a secondary storage from a present state to a the known state at the desired time prior to the present state by recording old data from a memory location in the secondary storage in which new data is written and by rewriting the old data over the new data in the memory location.

57. A computer-implemented method, comprising the steps of:

in response to receiving a write command regarding a first data, storing the first data to a secondary storage;

in response to receiving a read command regarding a second data, determining whether the second data is stored on the secondary storage;

upon determining that the second data is stored on the secondary storage, reading the second data from the secondary storage; and upon determining that the second data is not stored on the secondary storage, reading the second data from a primary storage; and in response to receiving a restore command, resetting the secondary storage to an initial state, and the computer-implemented method further comprising steps of:

recording a log of communication activity occurring at a connection point between a host device, a primary storage and a secondary storage; and also in response to receiving a restore command after resetting the secondary storage to an initial state, performing a forward restoration process by duplicating the communication activity occurring at the connection point to restore the secondary storage to a known state at a desired time.

58. The method of claim 57, further comprising in response to receiving a reconcile command, establishing a new initial state.

59. The method of claim 58, further comprising in response to receiving the reconcile command, resetting the initial state of the secondary storage.

60. The method of claim 57, wherein the step of recording a log of communication activity includes the step of recording each write transaction and corresponding write content.

61. The method of claim 60, wherein the step of recording a log of communication activity includes the step of recording a time stamp and a checksum for each transaction.

62. The method of claim 57, wherein the step of recording a log of communication activity includes the step of recording other communication a activity of concern for an application selected from a group of applications consisting of: forensic applications and diagnostic applications.

63. The method of claim 57, wherein the step of recording a log of communication activity includes the steps of: (i) prior to writing new data to a memory location in the secondary storage, reading old data stored in the memory location; and (ii) recording the old data and header information to the audit trail, the method further comprising the step of: alternatively in response to receiving a restore command, performing a reverse restoration process by writing the old data recorded in the audit trail back into the corresponding memory location in the secondary storage beginning with e a present state and ending with the known state.

64. A computer-implemented method; comprising:

in response to receiving a write command regarding a first data, storing the first data to a secondary storage;

in response to receiving a read command regarding a second data, determining whether the second data is stored on the secondary storage;

upon determining that the second data is stored on the secondary storage, reading the second data from the secondary storage; and upon determining that the second data is not stored on the secondary storage, reading the second data from a primary storage;

in response to receiving a restore command, resetting the secondary storage to an initial state, and in response to receiving a reconcile command, establishing a new initial state and resetting the initial state of the secondary storage, and the computer-implemented method further comprising steps of:

recording a log of communication activity occurring at a connection point between a host device, the primary storage and the secondary storage, including the steps of recording each write transaction and corresponding write content and recording a time stamp and a checksum for each transaction; and also in response to receiving a restore command after resetting the secondary storage to an initial state, duplicating the communication activity occurring at the connection point to restore the secondary storage to a known state at a desired time.

65. A computer-implemented method for restoring a storage device to a known state, comprising the steps of:

recording data from a storage to a backup storage to establish an initial state; and recording a log of communication activity occurring at a connection point between a host device and the storage, wherein the connection point comprises a connector for a bus of the host device; and in response to a restore command, restoring the storage to the initial state by restoring data from the backup storage to the storage, and restoring the storage to a W known state at a desired time by chronologically duplicating the communication activity using the log of communication activity.

66. The method of claim 65, further comprising the step of:

in response to a reconcile command committing to a new initial state us a forward restoration process by recording data from storage to the backup storage, and resetting the log of communication activity to begin recording at the new initial state.

67. The method of claim 65, wherein the step of recording a the log of communication activity includes the steps of: (i) prior to writing new data to a memory location in the secondary storage, reading old data stored in the memory location; and (ii) recording the old data and header information to an audit trail, the method further comprising the step of: alternatively in response to receiving the restore command, performing a reverse restoration process by writing the old data recorded in the audit trail back into the corresponding memory location in the storage beginning with a present state and ending with the known state.

* * * * *